March 24, 1970   D. P. TUFFNELL ET AL   3,502,218
WATER SEPARATING FUEL FILTERS
Filed May 23, 1967   2 Sheets-Sheet 1

Inventors
Derrick Percival Tuffnell
& Stanley William Kemp
BY
George E. Johnson
Attorney March 24, 1970  D. P. TUFFNELL ET AL  3,502,218
WATER SEPARATING FUEL FILTERS Filed May 23, 1967  2 Sheets-Sheet 2

Inventors
*Derrick Percival Tuffnell*
*& Stanley William Kemp*
BY
*George E. Johnson*
Attorney though the filter element and these drops are entrained

United States Patent Office 3,502,218
Patented Mar. 24, 1970

3,502,218
WATER SEPARATING FUEL FILTERS
Derrick Percival Tuffnell, Southampton, and Stanley William Kemp, Totton, England, assignors to General Motors Corporation, Detroit, Mich., a corporation of Delaware
Filed May 23, 1967, Ser. No. 640,645
Claims priority, application Great Britain, May 26, 1966, 23,647/66; Feb. 25, 1967, 9,116/67
Int. Cl. B01d 29/06
U.S. Cl. 210—305    9 Claims

ABSTRACT OF THE DISCLOSURE

A fuel filter element in which a pleated paper element is arranged coaxially around and spaced from an imperforate tube to which end caps are secured, the upper end cap sealing the annular space between the tube and element and the lower end cap permitting filtered fuel, and entrained water droplets to pass radially outwards through a narrow gap between outlet openings in the end cap and a base plate member which is spaced a small distance from the lower end cap and extends to near the outer periphery thereof. The effect of this is to slow up the flow of liquid so that water droplets are delivered towards the outer periphery of a casing in which the filter element is arranged and do not tend to be re-entrained in the flow of filtered fuel which enters at the lower end of the centre tube.

---

Figure 1:
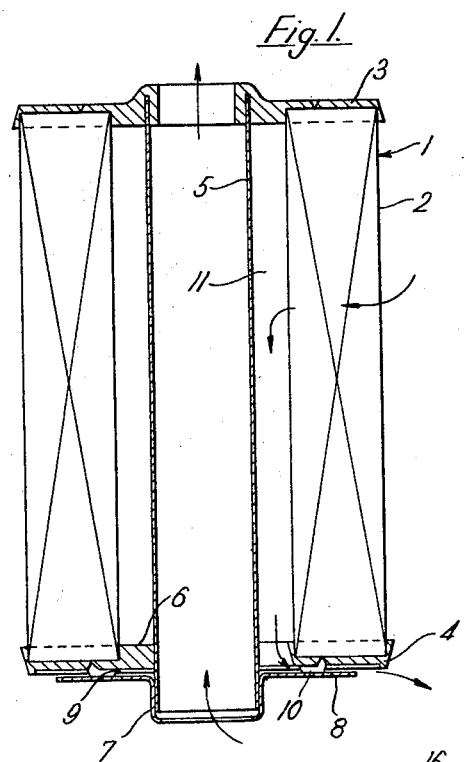

This invention relates to filters for liquids and in particular to filter units such as are used to filter liquid fuel and which, in addition to filtering out solid particles from the fuel, are intended to separate therefrom water which has become admixed with the fuel. Such filters commonly employ a filter unit which includes a filter element made of pleated synthetic resin-impregnated paper or other sheet filter material; and the filter commonly includes a collection vessel sealed to and located below the element, into which water droplets, separated by the element from the fuel, descend under the action of gravity.

A difficulty which arises in the operation of such filters is to prevent the water droplets, separated from the fuel by filtration, from becoming re-entrained in the filtered fuel.

A liquid filter unit according to the invention comprises a tubular filter element arranged coaxially around but radially spaced from a centre tube, the upper end of the element being sealed to an annular end cap member which is sealed to the upper end of the centre tube; the lower end of the element being sealed to an annular end cap member which is radially spaced from the centre tube; and the lower end of the centre tube having sealed thereto a co-axial annular base plate member which extends below the lower end cap member of the element and is axially spaced therefrom to form between the lower end cap and base plate members a shallow outlet passage which at its inner end opens into the annular space between the element and centre tube and at its outer end opens adjacent the outer periphery of the element.

In use, the filter unit is placed within the housing of the filter with the outer peripheral portion of said lower end cap sealed to the filter housing, conveniently on an annular shoulder therein, and with the upper end of the centre tube sealed to the filter outlet, the space between the outer surface of the filter unit and the filter housing being in communication with the inlet of the filter and the space in the filter housing below said shoulder being in communication with the outer end of said shallow annular passage and with the lower end of the centre tube.

In the operation of the filter, for example to filter liquid fuel which is contaminated with water, the particles of water in the fuel coalesce into larger drops as they pass in the flow of filtered fuel which, as it passes through the narrow passage between the lower end cap and base plate members travels substantially horizontally towards a wider diameter portion of the filter unit and the flow velocity of the filtered fuel and entrained water droplets therein is thereby substantially reduced. In addition, the flow of liquid, after passing through the outer end of the passage between the lower end cap and base plate members has substantially to reverse its direction of flow before it can pass upwardly through the centre tube to the filter outlet. As a result, the water droplets, which are discharged with the filtered fuel at a point which is as remote as possible from the centre tube, and which have suffered a substantial reduction in flow velocity, tend to separate from the flow of filtered fuel and have little tendency to become re-entrained in the fuel which passes upwardly through the lower end of the centre tube to the filter outlet.

Figure 2:
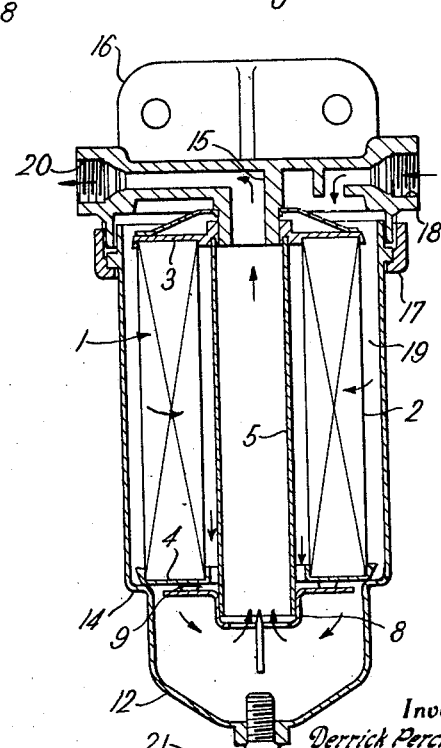
Figure 3:
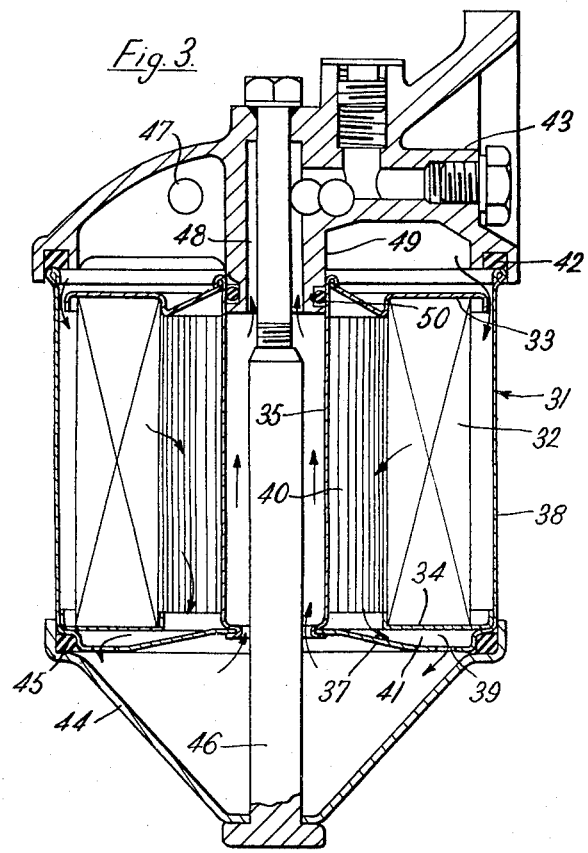
Figure 4:
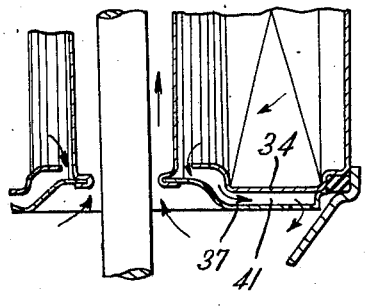

The invention and the method by which it is to be performed are hereinafter particularly described with reference to the accompanying drawings, in which:

FIGURE 1 is a vertical section through a filter unit according to the invention;
FIGURE 2 is a vertical section of a filter including the filter unit shown in FIGURE 1;
FIGURE 3 is a vertical section through another filter employing a modified form of construction of the filter unit shown in FIGURE 1; and
FIGURE 4 is a detail vertical section through another filter employing a further modification of the filter unit shown in FIGURE 1.

In the embodiment of the invention shown in FIGURES 1 and 2 a filter unit 1 is made from a strip of synthetic resin impregnated filter paper or other sheet filter material which is folded about transverse fold lines and joined at its ends to form a tubular pleated filter element 2 in which the fold lines of the pleats extend longitudinally of the element. The opposite ends of the element 2 are secured in and sealed to upper and lower annular end caps 3, 4 respectively the upper end cap 3 extending radially inwards beyond the inner periphery of the element 2 and being secured and sealed to the upper end of an imperforate centre tube 5 which is arranged coaxially within and spaced from the filter element 2. The lower end of the centre tube 5 extends axially beyond the lower end of the filter element 2; and the lower end cap 4 is co-axially spaced from the centre tube 5 by means of angularly spaced ribs 6 which are integral with the lower end cap 4.

Mounted on the lower end of the centre tube 5 is a base plate member formed as a flanged sleeve 7 which fits over and is secured, as by welding, to the lower end of the centre tube 5, the annular flange 8 of the sleeve being below and slightly spaced from the lower end cap 4, and the outer edge of the flange 8 terminating short of the outer periphery of the lower end cap 4, so as to form between the flange 8 and the end cap 4 a shallow annular passage 9. The lower end cap 4 (or the flange 8 of the base plate member 7, 8) is formed with integral ribs 10 or like spacer members so as to ensure the desired spacing between the lower end cap 4 and the annular flange 8 of the base plate member 7, 8.

With the construction described there is an annular space 11 between the inner periphery of the element 2 and the centre tube 5 which is in communication with the annular space 9 between the base plate member 7 and the lower end cap 4 by way of the spaces between the ribs 6.

The end caps 3, 4 are conveniently formed of plastics material and the spacer members 10 can conveniently be moulded integral with the lower end cap 4, as shown in FIGURE 1.

In use, as shown in FIGURE 2, the filter unit 1 described above is placed within a liquid fuel filter having a housing 12 with an annular shoulder 14 therein on which the outer peripheral portion of the lower end cap 4 rests and forms a seal therewith, the upper end of the centre tube 5, with the inner portion of the upper end cap 3 secured thereto, fitting over an outlet spigot 15 in an upper head 16 of the filter to which the housing 12 is secured by a clamp ring 17, an inlet opening 18 in the filter head 16 communicating with the annular space 19 between the outer periphery of the filter unit 1 and the filter housing 12. The outlet spigot 15 is in communication with an outlet opening 20 in the head 16.

When fuel contaminated with water is delivered to the inlet opening 18 it passes through the element 2 into the space 11 between the element and the centre tube 5. Particles of water which in passage through the filter element 2 have agglomerated into larger droplets are entrained in the filtered fuel which flows downwards in the space 11 towards the lower end of the filter unit 1 and then flows through the narrow annular space 9 between the lower end cap 4 and the flange 8 of the base plate member 7, 8. The flow velocity of the filtered fuel and entrained water droplets is substantially reduced during passage from the inner to the outer peripheral part of the annular space 9, and the flow of fuel is then substantially reversed before it passes upwardly through the lower end of the centre tube 5 to be discharged through the outlet spigot 15 and outlet opening 20 in the head 16. As a result of the reduced flow velocity and the abrupt change in direction of the fuel, the droplets of water, which are heavier than the fuel, tend to fall under gravity to the bottom part of the filter housing 12 which is conveniently provided with a drain plug 21 to permit the emptying of the filtered out water from the housing 12.

In another embodiment of the invention, shown in FIGURE 3, a fuel filter unit 31 includes a pleated paper element 32 the upper and lower ends of which are respectively sealed to metal end caps 33 and 34. The upper end cap extends radially inwards beyond the inner periphery of the element 32 and is sealed to the upper end of an imperforate centre tube 35 which is arranged coaxially within and spaced from the filter element 32. The lower end cap 34 is radially spaced from the lower end of the centre tube 35.

Secured and sealed to the lower end of the centre tube 35, as by a crimped joint, as shown, is the inner periphery of an annular base plate member 37 which is formed of sheet metal and is integral with a wall 38 which surrounds the filter element 32 and forms with the base plate member 37 a cup shaped member. The base plate member 37 has near its junction with the wall 38 a plurality of outlet openings 39 therein. The outer peripheral portion of the lower end cap 34 is sealed to the wall 38, conveniently, as shown, to an annular shoulder at the junction between the wall and the base plate member 37.

The base plate member 37 may have spacer ribs or like formations impressed therein to space it from the lower end cap member 34.

It will be seen that with this construction there is formed, between the filter element 32 and the centre tube 35 an annular space 40 which at its lower end is in communication with a shallow annular space 41 which extends between the lower end cap 34 and the base plate member 37 and has outlets 39 adjacent the outer periphery of the filter element 32.

In the use of the filter unit 31 the unit is secured with the upper edge of the wall 38 pressed into sealing contact with a gasket 42 in an annular recess in a filter head 43, the lower end of the filter unit being engaged by the rim of a conical water collection vessel 44; an annular gasket 45 is interposed between the rim of the vessel and the annular shoulder at the lower end of the wall 38. A centre bolt 46 mounted coaxially in the base of the water collection vessel 44 extends through the centre tube 35 and is secured in the filter head 43 so as to press the vessel 44 and the filter unit 31 into sealing engagement with each other and with the filter head 43.

An inlet passage 47 in the head 43 is in communication with the space between the wall 38 and the exterior of the filter element 32; and the space within the centre tube 35 is in communication with an outlet passage 48 in an outlet spigot 49 in the filter head. The centre tube 35 is sealed to the spigot 49 by means of an O-ring 50 mounted in an annular recess thereon.

In use, fuel delivered through the inlet passage 47 passes from the outside to the inside of the pleated paper filter element 32, particles of water which in passage through the filter element have agglomerated into larger droplets being entrained in the flow of filtered fuel which passes from the space 40 at the lower end of the filter element to the shallow annular space 41 to be discharged through the outlet openings 41 near the outer peripheral portion of the base plate member 37. The flow velocity of the filtered fuel and the entrained water droplets is substantially reduced during passage from the inner to the outer peripheral part of the annular space 41 and the flow of fuel is then substantially reversed after it passes through the outlet openings 41 before passing radially inwards and upwardly through the centre tube 35 to the outlet passage 48. As a result of the reduced flow velocity and the abrupt change in direction, the droplets of water instead of being entrained in the flow of filtered fuel, tend to fall under gravity to the bottom part of the water collection vessel 44.

Instead of making the wall 38 integral with the base plate member 37 it may, as shown in FIGURE 4, be made an integral part of the lower end plate 34, the base plate member 37 being secured, as by welding, at its outer edge to the outer peripheral portion of the lower end cap 34.

It will be seen that the filter units shown in FIGURES 3 and 4 are in essentials of the same construction as that shown in FIGURES 1 and 2, the construction shown in FIGURES 3 and 4 including members, integral with either the base plate member or the lower end cap, to form a part of a housing which surrounds the filter element. In all of the forms of construction described and shown the drops of water entrained in the filtered fuel are first reduced in velocity by passage from the inner to the outer peripheral part of a narrow annular space, and are then caused to reverse their direction of flow so that, because of the greater density of the water droplets compared with that of the fuel, they tend to separate out from the fuel at a point remote from the point at which the filtered fuel passes out of the filter unit and are thus unlikely to become re-entrained in the flow of filtered fuel delivered from the filter unit.

We claim:

1. A liquid filter unit comprising a tubular filter element arranged coaxially around and radially spaced from a centre tube to form an annular chamber therebetween, said centre tube being imperforate intermediate its ends, the upper end of the element being sealed to an upper annular end cap member, said upper annular end cap member also being sealed to the upper end of the centre tube to close the annular space between the upper ends of the element and centre tube; the lower end of the element being sealed to a lower annular end cap member, said lower annular end cap member being radially spaced from the centre tube to leave an annular space therebetween which serves as the outlet from said annular chamber; and the lower end of the centre tube having sealed thereto a co-axial annular base plate member which extends below the lower end cap member of the element and is axially spaced therefrom to form between the lower end cap and base plate members a shallow annular outlet passage which at its inner end opens into the annular space between the lower end cap member and centre tube and at its outer end opens adjacent the outer periphery of the element.

2. A filter unit according to claim 1, in which said element is made of pleated synthetic resin impregnated sheet filter material.

3. A filter unit according to claim 1, in which said end cap members are of plastics material.

4. A filter unit according to claim 1, in which said end cap members are of metal.

5. A filter unit according to claim 3, in which said lower end cap member is spaced from said base plate member by means of spacer formations integral with one of said members.

6. A filter unit according to claim 3, in which said lower end cap member is spaced from said centre tube by angularly spaced ribs integral with the end cap.

7. A filter unit according to claim 1, incorporated in a housing having a central outlet passage to which the upper end of the centre tube is sealed; an annular shoulder to which the outer edge of said lower end cap member is sealed; a water collection vessel below said shoulder in communication with the outer end of said shallow annular outlet passage and with the lower end of said centre tube; and an inlet in said housing in communication with the annular space formed between the exterior of the unit and the surrounding wall of the housing above said shoulder.

8. A filter unit according to claim 7, in which one of said lower end cap and base plate members is integral with the wall which surrounds the filter element.

9. A filter unit according to claim 8, in which said base plate member is formed with a plurality of openings therein adjacent the outer periphery of the element, said openings forming the oultet from the outer end of said shallow outlet passage.

References Cited

UNITED STATES PATENTS

| | | | |
|---|---|---|---|
| 2,864,505 | 12/1958 | Kasten | 210—444 X |
| 3,187,895 | 6/1965 | Pall et al. | 210—307 X |
| 3,227,280 | 1/1966 | Hathaway et al. | 210—438 |
| 3,228,527 | 1/1966 | McPherson. | |
| 3,262,572 | 7/1966 | Cook | 210—438 X |
| 3,390,778 | 7/1968 | Uhen | 210—440 X |

FOREIGN PATENTS 550,998 9/1956 Belgium.

REUBEN FRIEDMAN, Primary Examiner

W. S. BRADBURY, Assistant Examiner

U.S. Cl. X.R.

210—307, 438, 440, 443